US010887646B2

(12) United States Patent
Zane et al.

(10) Patent No.: US 10,887,646 B2
(45) Date of Patent: Jan. 5, 2021

(54) LIVE STREAMING WITH MULTIPLE REMOTE COMMENTATORS

(71) Applicant: Kiswe Mobile Inc., Bethesda, MD (US)

(72) Inventors: Francis X. Zane, New Providence, NJ (US); Thomas J. Janiszewski, Andover, NJ (US); Yung-Lung Ho, Bethesda, MD (US); Wim Sweldens, Summit, NJ (US)

(73) Assignee: Kiswe Mobile Inc., Rockville, MD (US)

( * ) Notice: Subject to any disclaimer, the term of this patent is extended or adjusted under 35 U.S.C. 154(b) by 127 days.

(21) Appl. No.: 16/225,335

(22) Filed: Dec. 19, 2018

(65) Prior Publication Data

US 2020/0059687 A1 Feb. 20, 2020

Related U.S. Application Data (60) Provisional application No. 62/719,278, filed on Aug. 17, 2018.

(51) Int. Cl.
*G06F 15/16* (2006.01)
*H04N 21/43* (2011.01)
(Continued)

(52) U.S. Cl.
CPC ..... *H04N 21/4307* (2013.01); *H04N 21/2187* (2013.01); *H04N 21/23424* (2013.01); *H04N 21/8106* (2013.01); *H04N 21/8456* (2013.01)

(58) Field of Classification Search
CPC ........... H04N 21/4307; H04N 21/2187; H04N 21/23424; H04N 21/8106; H04N 21/8456
See application file for complete search history.

(56) References Cited

U.S. PATENT DOCUMENTS 6,239,793 B1 *  5/2001  Barnert ................. H04H 20/18
                                                          709/203
8,094,728 B2 *  1/2012  Morris ............... H04N 21/4334
                                                          375/240.26
(Continued)

FOREIGN PATENT DOCUMENTS

WO    2017096517 A1   6/2017
WO    2018027237 A1   2/2018

OTHER PUBLICATIONS

NPL Google Patents (Year: 2020).*
NPL IP.com (Year: 2020).*

*Primary Examiner* — Razu A Miah
(74) *Attorney, Agent, or Firm* — Ryan, Mason & Lewis, LLP (57) ABSTRACT

A method comprises receiving video content from at least one video source, timestamping frames of the video content to generate respective first timestamps, and providing the frames in association with the respective first timestamps to a commentator application. The method further includes receiving audio content from the commentator application in association with respective second timestamps, combining the frames of the video content with the received audio content based at least in part on the first timestamps and the second timestamps to generate commented video content, and providing the commented video content to one or more servers of a content delivery network for delivery to one or more viewer devices. A plurality of distinct streams of audio content may be received from respective distinct commentator applications, and the frames of the video content combined with the plurality of distinct streams of audio content to generate the commented video content.

20 Claims, 4 Drawing Sheets

(51) Int. Cl.
  *H04N 21/2187* (2011.01)
  *H04N 21/81* (2011.01)
  *H04N 21/845* (2011.01)
  *H04N 21/234* (2011.01)

(56) References Cited

U.S. PATENT DOCUMENTS

| | | | |
|---|---|---|---|
| 8,230,343 B2 * | 7/2012 | Logan | H04H 20/28 |
| | | | 715/723 |
| 9,635,431 B2 | 4/2017 | Zane et al. | |
| 9,654,844 B2 | 5/2017 | Kim et al. | |
| 9,661,355 B2 | 5/2017 | Ho | |
| 9,832,491 B2 | 11/2017 | Ho | |
| 9,858,340 B1 * | 1/2018 | Frey | G06K 9/6296 |
| 9,900,362 B2 | 2/2018 | Kim et al. | |
| 9,942,343 B2 | 4/2018 | Zane et al. | |
| 2006/0195881 A1 * | 8/2006 | Segev et al. | |
| 2008/0188209 A1 * | 8/2008 | Dorogusker et al. | |
| 2009/0307258 A1 * | 12/2009 | Priyadarshi et al. | |
| 2010/0088406 A1 * | 4/2010 | Yu et al. | |
| 2010/0174733 A1 * | 7/2010 | Kim et al. | |
| 2010/0265398 A1 * | 10/2010 | Johnson et al. | |
| 2010/0269128 A1 * | 10/2010 | Gordon | |
| 2011/0202967 A1 * | 8/2011 | Hecht et al. | |
| 2012/0117584 A1 * | 5/2012 | Gordon | |
| 2013/0117798 A1 * | 5/2013 | Ha et al. | |
| 2013/0336412 A1 * | 12/2013 | Erofeev | G11B 27/031 |
| | | | 375/240.28 |
| 2014/0188997 A1 | 7/2014 | Schneiderman et al. | |
| 2014/0281001 A1 * | 9/2014 | Harrison et al. | |
| 2014/0351045 A1 * | 11/2014 | Abihssira et al. | |
| 2014/0372888 A1 * | 12/2014 | Hoffert et al. | |
| 2015/0092106 A1 | 4/2015 | Savare et al. | |
| 2015/0143413 A1 * | 5/2015 | Hall et al. | |
| 2015/0229695 A1 * | 8/2015 | Kim et al. | |
| 2015/0341528 A1 * | 11/2015 | Ren | |
| 2016/0205349 A1 * | 7/2016 | Cheng et al. | |
| 2016/0205418 A1 * | 7/2016 | Ho | |
| 2016/0234542 A1 * | 8/2016 | Stokking | H04N 21/845 |
| 2017/0142451 A1 | 5/2017 | Xu et al. | |
| 2018/0077467 A1 | 3/2018 | Novobilski | |
| 2018/0132011 A1 * | 5/2018 | Shichman | H04N 21/23418 |
| 2018/0204595 A1 * | 7/2018 | McNamee | G11B 27/005 |

* cited by examiner

LIVE STREAMING WITH MULTIPLE REMOTE COMMENTATORS

PRIORITY CLAIM

This application claims priority to U.S. Provisional Patent Application Ser. No. 62/719,278, filed Aug. 17, 2018 and entitled "Live Streaming with Multiple Remote Commentators," which is incorporated by reference herein in its entirety.

FIELD

The field relates generally to live video and other types of media content, and more particularly to processing of media content.

BACKGROUND

The rapidly growing use of mobile devices such as laptops, tablets and cellphones has greatly diversified the available modes of media consumption. In these and other contexts, a wide variety of different media streaming techniques are known, including techniques for streaming of media over the Internet using hypertext transfer protocol (HTTP). A more specific example of an HTTP streaming technique is the Apple HTTP Live Streaming (HLS) protocol. Despite recent advances in this area, a need remains for improved techniques for streaming of live video and other types of media content.

SUMMARY

Illustrative embodiments of the invention provide content delivery systems with functionality for live video streaming augmented with audio commentary from one or more remote commentators.

The growing capacity of the Internet to accommodate streaming media has naturally lead to rapid increases in the number of live events that can be viewed online. Both major and niche events can now reach audiences everywhere with Internet connectivity. For example, a live event, such as a sporting event or an e-gaming event, can be watched by many people in different countries or other geographic regions around the world, possibly with different commentary audio provided to different audiences in the local language of their respective countries or other geographic regions.

In conventional practice, such arrangements generally require having multiple commentators fluent in various languages physically present either at the event or in television studios equipped with specialized television studio equipment. The specialized television studio equipment may include, for example, specialized digital video processing hardware used to keep voice from one or more of the commentators and video from the live event synchronized in a broadcast to a given audience.

Unfortunately, these conventional approaches are unduly expensive, in that they require the commentators to travel either to the actual event or to a television studio, and also require the above-noted specialized television studio equipment. Such conventional approaches can be prohibitively expensive for many less affluent markets, and moreover do not readily scale to large numbers of commentators.

Illustrative embodiments disclosed herein solve these and other problems of conventional approaches, for example, by allowing multiple remote registered commentators, equipped with widely-available personal computing devices, such as personal computers, tablets, or smartphones, suitably modified with respective commentary applications, to add commentary over the Internet to existing live streaming video and audio broadcasts.

In some embodiments, video is generated at a live event and there are one or more registered remote commentators in respective different locations remote from the live event each of whom generates audio that is combined with the video of the live event.

A media processor is illustratively configured in accordance with techniques disclosed herein to ensure that the audio from the remote commentators and the video from the live event are correctly synchronized and mixed before the combined content is segmented and distributed to end users.

In one embodiment, a method comprises receiving video content from at least one video source, timestamping frames of the video content to generate respective first timestamps, providing the frames in association with the respective first timestamps to a commentator application, receiving audio content from the commentator application in association with respective second timestamps, combining the frames of the video content with the received audio content based at least in part on the first timestamps and the second timestamps to generate commented video content, and providing the commented video content to one or more servers of a content delivery network for delivery to one or more viewer devices. The video content illustratively comprises live video from at least one live video source, such as a video camera at a live event, although other types of video content can be combined with audio content from one or more commentator applications in other embodiments. A plurality of distinct streams of audio content may be received from respective distinct commentator applications, with the frames of the video content being combined with the plurality of distinct streams of audio content to generate the commented video content.

Illustrative embodiments are advantageously configured to readily accommodate large numbers of remote commentators, such as remote commentators that are located in close enough proximity to one another so as to have sufficiently low voice communication delay between them. For example, multiple groups of such remote commentators can be present in respective different countries or other geographic regions with each such group providing audio commentary for the content delivered to that country or other geographic region. Numerous other arrangements are possible in other embodiments.

DETAILED DESCRIPTION

Embodiments of the invention will be illustrated herein in conjunction with exemplary content delivery systems that include particular arrangements of networks, devices and other components. It should be understood, however, that embodiments of the invention are more generally applicable to a wide variety of other types of content delivery systems and associated networks, devices or techniques. The term "content" as used herein is intended to be broadly construed so as to encompass, for example, live video or other types of multimedia streams as well as other types of content that are deliverable to devices over one or more networks in a content delivery system.

Illustrative embodiments include but are not limited to methods, apparatus, systems, processing devices, integrated circuits, and computer-readable storage media having computer program code embodied therein.

Some embodiments are configured to utilize streaming techniques that are based at least in part on the above-noted Apple HLS protocol. However, it is to be appreciated that other embodiments can be configured utilizing a wide variety of other types of streaming protocols and accordingly are not limited to use with live streaming or HTTP.

Additionally or alternatively, some embodiments are configured to utilize techniques disclosed in one or more of U.S. Pat. No. 9,635,431, entitled "Live Event Viewing via Mixed Live and On-Demand Streaming," U.S. Pat. No. 9,654,844, entitled "Methods and Apparatus for Content Interaction," U.S. Pat. Nos. 9,661,355 and 9,832,491, both entitled "Virtual Immersion Via Streamed Content Adaptation," U.S. Pat. No. 9,900,362, entitled "Methods and Apparatus for Reducing Latency Shift in Switching Between Distinct Content Streams," and U.S. Pat. No. 9,942,343, entitled "Efficient Content Streaming Utilizing Local Proxy Server Implemented on Client Device," each of which is incorporated by reference herein in its entirety. It is to be appreciated, however, that utilization of such techniques is not a requirement in any particular illustrative embodiment.

Figure 1:
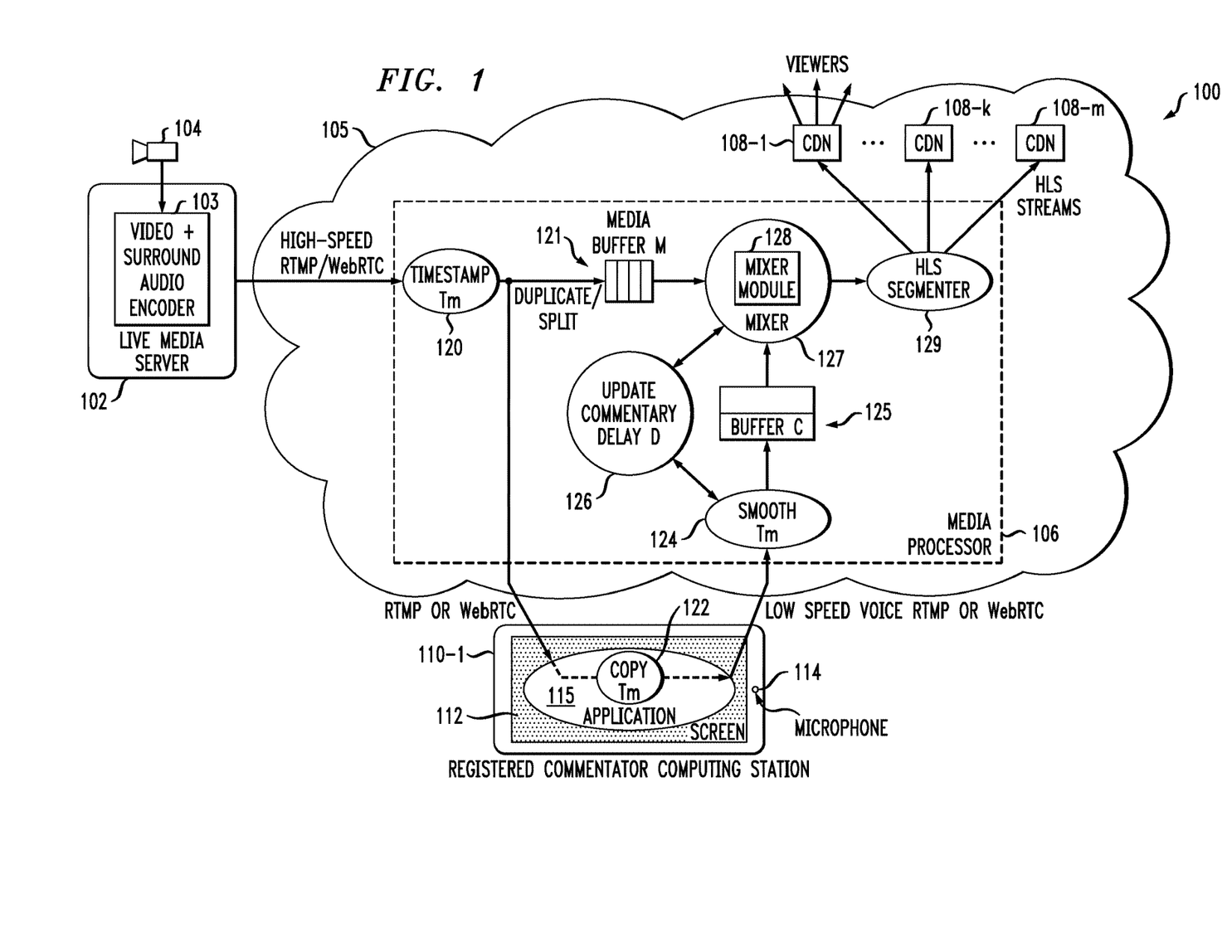
FIG. 1 is a block diagram of an exemplary content delivery system with a cloud-based remote commentator configuration in an illustrative embodiment.

FIG. 1 shows a content delivery system 100 that implements functionality for one or more remote commentators, although a commentator station of only a single remote commentator is explicitly shown in the figure. In this embodiment, the content delivery system 100 illustratively comprises a live media server 102 that comprises a video and surround audio encoder 103. The live media server 102 receives live video from a video camera 104 that is assumed to be arranged to capture video of a live event.

The live media server 102 is coupled to a network 105 that includes a media processor 106 and a plurality of content delivery network (CDN) web servers 108-1, . . . 108-k, . . . 108-m. The media processor 106 provides HLS streams including media segments and associated playlists to the CDN web servers 108. The CDN web servers 108 deliver content streams to respective client devices of respective viewers responsive to requests received from those client devices. Each such client device implements a media player for requesting and playing content for its corresponding viewer. The client devices of the respective viewers are not explicitly shown in the figure, but can include various types of mobile devices.

The playlists of the HLS streams may be illustratively implemented as respective "index files," although other types of playlists can be used in other embodiments. Such an index file or other type of playlist in some embodiments illustratively provides an ordered list of the Uniform Resource Locators (URLs) of the corresponding media segments. Other types of media segment identifiers can be used in other embodiments.

Also coupled to the network 105 is a registered commentator computing station 110-1, illustratively implemented as a cellphone, also referred to as a mobile telephone or a "smartphone," having a screen 112 and a microphone 114. The registered commentator computing station 110-1, which is also referred to herein as simply a "commentator station," may be viewed as an example of what is more generally referred to herein as a "registered commentator device." A wide variety of other types of registered commentator devices can be used, including various other types of mobile devices, client devices or other types of personal computing devices, such as personal computers or tablets.

The commentator station 110-1 implements a commentator application 115 that is configured to interact with the media processor 106 over the network 105 in providing remote commentary for live video. More detailed examples of such interaction will be described below in conjunction with the flow diagrams of FIGS. 2 and 4. The commentator application 115 is illustratively implemented at least in part as one or more software programs stored in a memory of the commentator station 110-1 and executed by a processor of the commentator station 110-1. The one or more software programs when executed provide functionality for delivering remote commentary from the commentator station 110-1 back to the media processor 106, at least in part responsive to video received from the media processor 106 and displayed on the screen 112 of the commentator station 110-1.

The remote commentator associated with the commentator station 110-1 provides audio input to the commentator application 115 via the microphone 114. Other types of input can be provided using other user input mechanisms. For example, touch input can be provided via the screen 112. Other user input mechanisms, such as a mouse or keyboard, can be used in addition to or in place of the touch-screen input mechanism. It is also possible that user input can be provided to the computing station via spoken commands or gestures, which are recognized by respective speech recognition or gesture recognition functionality implemented in the commentator station 110-1. Various combinations of these and other user input mechanisms can be used in a given embodiment.

A user of the commentator station 110-1 is also referred to herein in the context of some embodiments as a "registered commentator." Various authentication mechanisms can be used in illustrative embodiments in order to ensure that only commentators presenting the appropriate credentials can access the commentator application 115 on the commentator station 110-1.

The commentator application 115 in this embodiment is assumed to comprise a video streaming application, suitably adapted to support the remote commentator functionality disclosed herein. Other modules providing other functionality can also be implemented within the application. Moreover, the commentator station 110-1 can incorporate multiple applications, although only a single application is shown in the present embodiment. In some implementations, the commentator application 115 can comprise portions of multiple applications. Accordingly, the term "application" as used herein is intended to be broadly construed. Such an application is also referred to herein as an "application program" although it is to be appreciated that an application program can itself comprise multiple distinct software programs.

The commentator station 110-1 is just one example of a client device. It is to be appreciated that a wide variety of different media players or other client devices can be used, and such media players or other client devices need not be implemented using a built-in HLS client arrangement. For example, other types of built-in clients can be used. Thus, a "client device" as that term is broadly used herein should not be construed as being limited, for example, to a hardware-assisted media player that utilizes a client built into the media player operating system. Accordingly, in other embodiments, a client device can include an internal media player. The built-in HLS client can itself be considered a type of media player.

The CDN web servers 108 in the FIG. 1 embodiment are examples of what are also referred to as distributed HTTP based web servers or simply as distributed web servers. Such servers can be configured to deliver a wide variety of media content other than live video. The CDN web servers in some embodiments comprise a collection of distributed web servers that are set up in a cloud or other type of network such as network 105 in order to distribute live video or other types of media content. Numerous other arrangements of distributed web servers can be used in other embodiments.

The media processor 106 may comprise one or more video servers, and may also be referred to as a content provider server.

The network 105 over which the live media server 102, the commentator station 110-1, the media processor 106 and the CDN web servers 108 communicate is assumed to support HTTP communications. It should be noted that, although HTTP communications are used in the present embodiment, other embodiments can utilize other types of protocols for media streaming over the Internet, or more generally any of a wide variety of other techniques for media content delivery. At least a portion of the CDN web servers 108 may be part of a cloud arrangement.

Each of the CDN web servers 108 is configured for media streaming. Each such web server illustratively caches video segments and associated index files received from the media processor 106 over the network 105.

The content delivery system 100 can include multiple instances of components such as live media server 102, video camera 104 and media processor 106, although only single instances of such components are shown in the figure for clarity and simplicity of illustration.

Media segments and associated index files are supplied by the media processor 106 to at least a subset of the CDN web servers 108 over the network 105 via one or more connections. The encoding of video in illustrative embodiments can utilize known encoding techniques such as H.264. Also, the segmenting of the encoded video can be performed in accordance with known streaming protocols such as Apple HLS or Microsoft Smooth Streaming (MSS).

It is to be appreciated, however, that a wide variety of different encoding and segmenting techniques can be used in other embodiments, including, by way of example only, those techniques described in the above-cited U.S. Pat. No. 9,900,362.

Each of the CDN web servers 108 illustratively stores multiple index files as well as sets of video segments associated with respective ones of those index files. As noted above, index files are considered examples of what are more generally referred to herein as "playlists." The video segments are considered an example of what is more generally referred to herein as "media segments." A wide variety of different arrangements of index files or other types of playlists, and associated video segments or other types of media segments, can be used in different embodiments.

For example, in some embodiments, live video can be streamed within the content delivery system 100 utilizing HTTP streaming technology such as the above-noted HLS or MSS protocols. With HTTP streaming, video associated with a given content stream is segmented by the media processor 106. As soon as a given video segment is ready, it is delivered to the CDN web servers 108 so as to be available for mass distribution to client devices of respective viewers within the system 100. At session initiation, a media player obtains an initial master playlist indicating the available content streams and their associated web addresses (e.g., URLs). Depending on the streaming technology, locating the available content streams may be an indirect process where the master playlist points to index files that can be polled to indicate the URL and availability of the next segment.

Media streaming using HTTP based protocols has become ubiquitous due to its flexibility, compatibility with generic web servers such as CDN web servers 108 for content distribution, and ability to traverse common firewalls. HTTP streaming standards such as Apple HLS generally work by breaking the content stream into small HTTP-based file segments, which are distributed to the CDN web servers 108 and downloaded by request by a media player client via each segment's uniquely assigned web address (e.g., URL).

In some embodiments, HLS streaming relies on playlists that contain the URLs of the available media segments. These playlists reside in the same CDN web servers 108 with the media segments to be streamed. At session initiation, the media processor 106 downloads a master playlist containing the URLs of the various alternative playlists available for the desired content. Mostly, the optional playlists allow the player to optimize playback based on screen resolution and bandwidth availability. Once given the playlist URLs, a built-in HLS client can autonomously download the referenced playlist, request media segments, then reconstruct and play the requested video stream.

In addition to the above-noted bandwidth options, HLS supports different content specific playlists, including live playlists, event playlists, and video-on-demand (VoD) playlists, as described in Apple Technical Note TN2288, which is incorporated by reference herein. The VoD playlist, which is used for playback of prerecorded media, contains references to all the media segments for the video. The client needs to download the list only once at the start of a session. On the other hand, both live and event types of broadcast require continuous updates to their respective playlists as new video segments are created and uploaded to the CDN web servers. As such, the client must also repeatedly download the referenced playlist to get the latest media segment URL.

The operation of the media processor 106 and its interaction with commentator application 115 of the commentator station 110-1 to support remote commentator functionality will now be described in more detail.

In one possible operating scenario, the media processor 106 receives video content from the live media server 102. The video content includes video of a live event as captured by the video camera 104 and may additionally include associated surround audio from multiple microphones deployed at the live event. The video content is delivered from the live media server 102 to the media processor 106 via the network 105, illustratively using a high-speed connection based on a protocol such as real-time messaging protocol (RTMP) or web real-time communications (WebRTC).

The media processor 106 includes a timestamp module 120 that generates timestamps for respective frames of the video content. A given such timestamp is denoted Tm in the figure, and is an example of what is also referred to herein as a "first timestamp." The timestamp module 120 timestamps incoming frames of the video content to generate respective first timestamps.

The timestamped video content is duplicated or otherwise split as shown, to produce two identical streams, with a first one of the streams being applied to a media buffer 121 of the media processor 106, and a second one of the streams being delivered to the commentator application 115 of the commentator station 110-1 over the network 105. The second stream is illustratively delivered to the commentator station 110-1 again using a protocol such as RTMP or WebRTC, but possibly at a slower speed than that used by the high-speed connection between live media server 102 and media processor 106.

A timestamp module 122 in the commentator application 115 is configured to associate frames of audio content comprising audio input received from the remote commentator via microphone 114 with respective timestamps copied from the timestamped frames of the video content received from the media processor 106. The copied timestamps are examples of what are more generally referred to herein as "second timestamps" that are associated with respective frames of audio content in the commentator application 115. A given such second timestamp more particularly comprises a copy of a corresponding one of the first timestamps, with the copy being generated by the timestamp module 122 of the commentator application 115. The resulting copied timestamp can then be inserted into the appropriate frame of the audio content by the commentator application 115.

The timestamped audio content is provided by the commentator application 115 back to the media processor 106 over network 105, illustratively using a low-speed voice connection but again implemented using a protocol such as RTMP or WebRTC.

The media processor 106 receives the frames of the audio content from the commentator application 115 in association with respective second timestamps. For example, the media processor 106 illustratively receives from the commentator application 115 a plurality of audio frames having inserted therein respective ones of the second timestamps that are copies of corresponding ones of the first timestamps. The media processor 106 combines the frames of the video content with the received audio content based at least in part on the first timestamps and the second timestamps to generate commented video content that is provided to the CDN web servers 108 for delivery to client devices of respective viewers. Such client devices are also referred to herein as "viewer devices."

This is an example of an arrangement in which the frames of the video content are provided by the media processor 106 in association with the first timestamps to the commentator application 115 of the commentator station 110-1 at a first relatively low video quality level and the commented video content is provided by the media processor 106 to the CDN web servers 108 at a second relatively high video quality level.

The combining of the frames of the video content with the audio content received from the commentator station 110-1 illustratively proceeds in the following manner in the media processor 106. As mentioned previously, the frames of the video content are stored in the media buffer 121 of the media processor 106. The media buffer 121, also denoted as media buffer M herein, is an example of what is more generally referred to herein as a "video frame buffer."

The frames of the received audio content are processed through a timestamp smoothing module 124 and then stored in an audio frame buffer 125, also denoted as commentary buffer C herein. For example, in some embodiments the timestamp smoothing module 124 extracts respective ones of the second timestamps from respective frames of the received audio content and applies a smoothing algorithm to the extracted second timestamps, such that the smoothed second timestamps can be utilized by the media processor 106 in combining the frames of the video content with the received audio content. Other types of timestamp smoothing arrangements can be used in other embodiments.

The media processor 106 further comprises a delay update module 126, configured to control an updated commentary delay of the received audio content. For example, in some embodiments, a current commentary delay D is determined by the delay update module 126 as a function of a measured delay of a frame of the audio content and a jitter accommodation component for the commentator application 115. The measured delay of the frame of the audio content in such an arrangement is illustratively determined as a function of a corresponding one of the second timestamps, after smoothing, and the processor clock time. The jitter accommodation component for the commentator application 115 is illustratively determined by processing a plurality of the second timestamps, prior to smoothing. Numerous alternative delay update arrangements can be used.

The video frames from the media buffer 121 are combined with the audio frames from the audio frame buffer 125 by a mixer 127 that includes an internal media mixer module 128. This combination process illustratively utilizes an updated commentary delay provided to the mixer 127 by the delay update module 126. The resulting commented video content is segmented in an HLS segmenter 129 and delivered from the media processor 106 to each of the CDN web servers 108 over the network 105 as shown.

In combining the frames of the video content with the received audio content based at least in part on the first timestamps and the second timestamps to generate commented video content, the mixer 127 illustratively compares a current commentary delay to a designated delay, and responsive to a difference between the current commentary delay and the designated delay being above a specified threshold, resetting the designated delay to the current commentary delay. The mixer 127 is further configured to determine a start time of a current output frame of the commented video content as a function of a processor clock time and the designated delay, and to initiate output of the current output frame of the commented video content in accordance with the determined start time.

The media processor 106 can be further configured to perform additional operations in conjunction with combining the frames of the video content with the received audio content based at least in part on the first timestamps and the second timestamps to generate commented video content. For example, the media processor 106 can delete from each of one or more of the media buffer 121 and the audio frame buffer 125 one or more frames having timestamps earlier than a current output frame start time. As another example, the media processor 106 can, responsive to detection of an empty video or audio frame buffer, or a video or audio frame having a timestamp greater than a sum of the current output frame time and a frame duration, insert a video or audio loss concealment frame. Additionally or alternatively, responsive to a measured delay of an audio frame of the audio content exceeding a specified threshold, the media processor 106 can signal the commentator application 115 to restart its playback of the video content.

In the FIG. 1 embodiment, the frames of video content are generated by live media server 102 and its video and surround audio encoder 103 which processes live video from video camera 104 at a live event. The live media server 102 is illustratively located at the venue of the live event, but other arrangements are possible. There is at least one registered remote commentator associated with the commentator station 110-1 in a location remote from the live event. The remote commentator generates audio commentary regarding the live event as he or she views the corresponding live video on the commentator station 110-1. The media processor 106 ensures that the audio and video is correctly synchronized and mixed before it is segmented and distributed to the CDN web servers 108 for delivery to end users.

It should be noted that the live video supplied by the live media server 102 to the media processor 106 also illustratively comprises audio, such as audio encoded with the video utilizing the video and surround audio encoder 103. Such surround audio should be understood to be distinct from commentary audio supplied by a remote commentator and mixed with the live audio in the media processor 106.

As will become more apparent from the embodiments of FIGS. 3 and 4 to be described below, the FIG. 1 embodiment can be extended to accommodate multiple remote commentators, assuming by way of example that such remote commentators are located in close enough proximity to one another so as to have sufficiently low voice communication delay between them. For example, multiple commentators speaking a particular language can all be located within the same country or geographic region. The content delivery system 100 can therefore generate multiple distinct commented video content streams, each with commentary from one or more remote commentators in a particular language, for delivery to respective distinct audiences in different countries or other geographic regions. Accordingly, multiple groups of remote commentators can be present in respective different countries or other geographic regions with each such group providing audio commentary in the appropriate language for the content delivered to that country or other geographic region.

Illustrative embodiments allow the remote commentators to work from any location with Internet access even if not enough bandwidth is available to receive the highest original quality video of the event. The end user video quality is independent of the quality of the commentator's downstream video. Moreover, as asymmetrical connections are still the norm for home Internet links, the system requires commentators to have sufficient bandwidth to downstream video at some minimal level of quality, but only up-streams lower bandwidth voice.

Although the remote commentator in some embodiments is at a location remote from the live event venue, it is possible in other embodiments for one or more commentators to be present at the live event venue and adding their commentary to the live video from that site, albeit using a registered commentator computing station and its associated functionality as illustrated in FIG. 1 instead of conventional specialized television studio equipment.

Many different protocols can be used for streaming audio and video in illustrative embodiments. These include the above-noted RTMP, WebRTC and HLS protocols, as well as other protocols such as real-time transport protocol (RTP). Illustrative embodiments are independent of the particular video streaming protocol used in any part of the system. That said, a typical embodiment such as that shown in FIG. 1 is illustratively configured to utilize real-time protocols such as RTMP and WebRTC between the live media server 102, the media processor 106, the commentator stations such as commentator station 110-1, and the distributor. The "distributor" as that term is broadly used herein is intended to encompass, for example, a content distribution entity providing at least a subset of the CDN web servers 108. The distributor would typically deliver the content using protocols such as HLS that scale well for a large number of viewers using CDN technology.

In the FIG. 1 embodiment, the content delivery system 100 in its media processor 106 combines video from a live source with audio-only commentary from a remote commentator. The live media server illustratively compresses the video streamed from a live source, e.g., a live event or an electronic video gaming system. The resulting encoded video streams are sent to the media processor 106.

The media processor 106 is shown in FIG. 1 as being implemented in the network 105 but could in other embodiments be co-located with the live media server 102 adjacent the network edge. Alternative cloud-based implementations of the media processor 106 are also possible. In addition, as mentioned previously, there may be multiple instances of the media processor 106 distributed at distinct locations within the system 100. The media processor 106 in illustrative embodiments is configured to synchronize audio from the remote commentator with the live event video and to forward the mixed stream to the distributor.

To maximize quality for every viewer, the live video uplink from the live media server 102 to the media processor 106 should have sufficient bandwidth to support high-resolution video streams with high reliability, minimum delay, and low jitter. An important aspect of some embodiments is that the distributor has access to the highest quality video from the original event irrespective of the Internet bandwidth available to the remote commentator. For example, illustrative embodiments allow for a scenario where end users have higher Internet bandwidth than the remote commentator and will receive better video quality of the original event than that received by the remote commentator.

Notably, with current streaming protocols, media servers commonly stream multiple versions of the same content, each encoded to different levels of quality of service (QoS). The viewing device of an end user negotiates with one or more of the CDN web servers 108 to obtain the best quality video that its network connection can support. This aspect of the system can be considered standard practice and is therefore not illustrated in FIG. 1.

At the time of ingestion by the media processor 106, each frame of the incoming media stream is timestamped with a corresponding timestamp Tm, by the timestamping module 120 of the media processor 106. The timestamped stream is then duplicated with a copy sent to the commentator station 110-1. Similar to other viewers, the commentator station 110-1 receives a stream quality that depends on the supportable bandwidth of the video downlink from the media processor 106 to the commentator station 110-1. Simultaneously, the video frames are sent to the media buffer 121, where they are queued until the matching commentator's audio stream is received and ready for mixing.

The commentator application 115 installed in the commentator station 110-1 allows the commentator to sign on, view, and comment on the event. This can for example be implemented inside a standard browser or as a stand-alone software implementation. The commentator application 115 will play the video from the original event to the commentator, usually via built-in media players in the browsers or mobile devices, and at the same time record the commentator's audio.

An important aspect of some embodiments is that the commentator application 115 will copy the timestamps Tm of the original event video as extracted by the commentator's video player and insert them into the audio frames being sent back to the media processor 106. This marks the audio stream with the appropriate timing information from the video frame, effectively linking what was said with what was seen on-screen by the commentator at that moment, for later synchronization. The video from the original event, however, will not be sent back from the commentator to the media processor. Thus, the voice uplink from the commentator station to the media processor can have substantially lower bandwidth as it is only being used to send back the commentator's audio stream.

The media processor 106 ingests the commentator voice stream and reads the timestamps Tm from the audio stream before queuing the audio frames in the audio frame buffer 125, which as previously noted is also referred to herein as commentary buffer C. This stream of timestamps Tm, while providing a measure of audio delay, in some cases includes jitter introduced by a lower quality commentator video downlink as well as the queuing scheme deployed by the commentator's built-in video player. Therefore, the media processor 106 is configured to apply a smoothing algorithm in the timestamp smoothing module 124 to the timestamps Tm and then to re-timestamp the audio stream. For example, a standard exponential smoothing algorithm is applied in some embodiments. Other smoothing techniques, such as averaging over a sliding window time period, may also be used. The time constant or window size for smoothing is a parameter that can be configured via link quality testing during initialization of the commentator's custom application.

Each of the buffers 121 and 125 is assumed to be sized dynamically and can grow to accommodate ingested data up to preset maximums. In practice, to minimize latency, the mixer 127 extracts a frame for mixing shortly after an audio frame and its matching video, appropriately delayed by the mixer algorithm, are queued. A standard software-based media mixer module 128 within the mixer 127 can be used to insert the commentary into the media stream. Finally, the commented media frames are queued and segmented by a standard HLS segmenter 129 for distribution to the CDN web servers 108.

Figure 2:
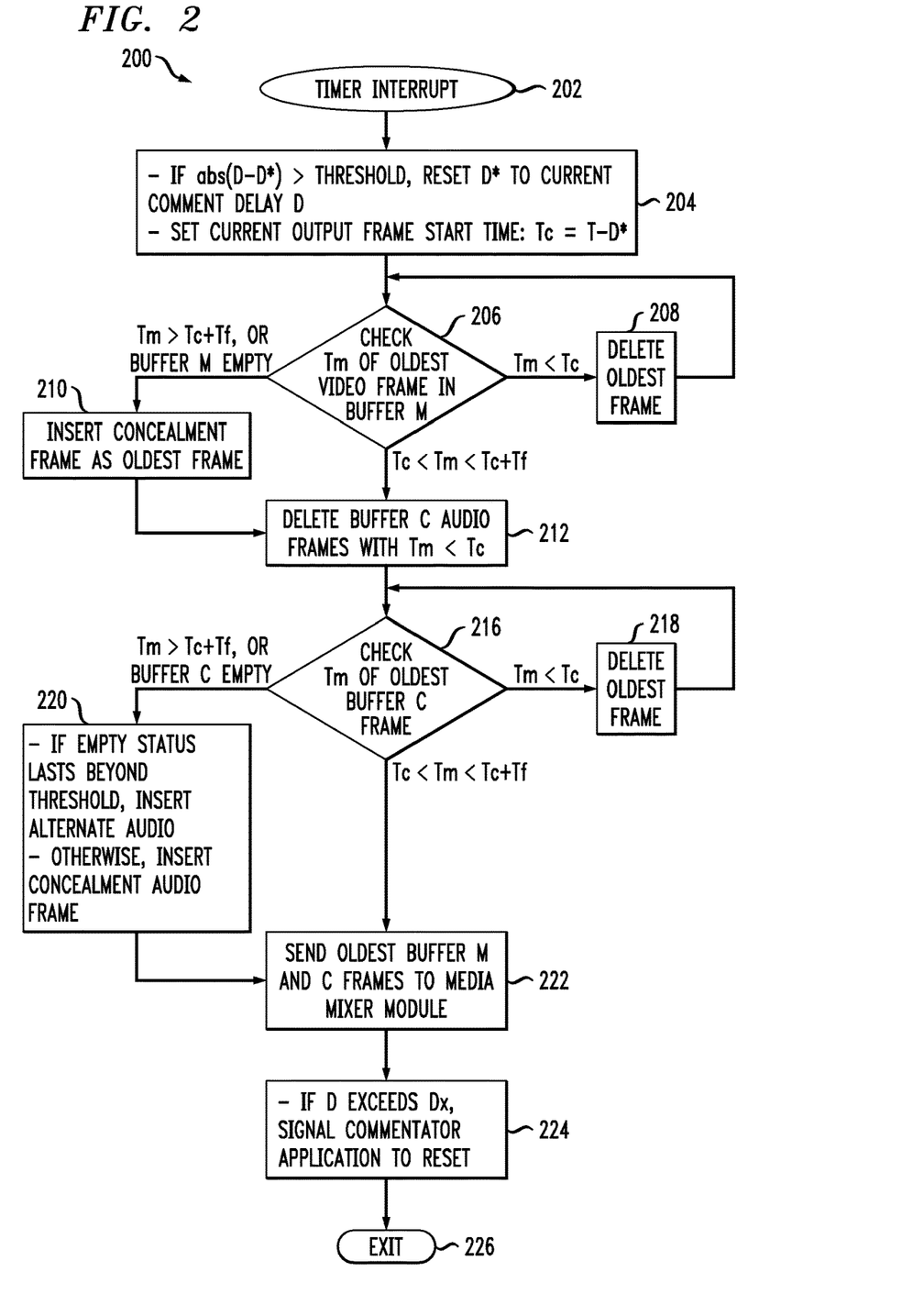
FIG. 2 is a flow diagram of a mixer algorithm in an illustrative embodiment.

FIG. 2 shows an example of a mixer algorithm 200 implemented at least in part by the mixer 127 in the media processor 106 in content delivery system 100 of FIG. 1. It is assumed that the mixer algorithm 200 is timer driven to generate video synchronously at a standard frame rate clock interval, e.g., 29.97 Hz.

The mixer algorithm 200 illustratively comprises repeated iterations of steps 202 through 226. Although these steps are performed primarily by mixer 127, other modules such modules 124 and 126, or more generally other portions of the media processor 106, can perform at least portions of one or more of the steps.

In step 202, a given iteration of the mixer algorithm 200 is triggered via a timer interrupt as shown.

In step 204, the current frame output time range is updated. The current frame output time range is bounded by frame starting time Tc and Tc+Tf, where Tf is the duration of a video frame. As shown, Tc is set as T−D*, where T is the clock time of the media processor 106. Essentially, the setting of Tc instructs the mixer 127 to delay the video frame output by a delay D*. D* is periodically reset to the measured current commentary delay D, when the difference between D and D* exceeds a preset threshold.

More specifically, D=Td+Tj where Td is the measured current audio delay and Tj is the extra delay added to accommodate potential jitter from the commentator's voice uplink. At each audio frame's ingestion, Td is calculated as T−Tm(smoothed). As the overall system is asynchronous, the measured current commentary delay D is likely to drift over time, necessitating the reset of D*. The reset threshold, however, is configured to minimize frequent resets to minimize interruption of the operation of the media mixer module 128.

Using real-time uplink protocols, Tj should be small and can be determined via link quality tests during system initialization. However, the present embodiment allows for Tj to be derived from the Tm data before smoothing and applied as a dynamic variable.

The mixer 127 then selects the appropriate input video and audio frames to mix from media buffer M and commentary buffer C, respectively, also denoted as respective buffers 121 and 125 in FIG. 1. This portion of the process is carried out using steps 206 through 222. In step 206, the mixer 127 checks the timestamp Tm of the oldest video frame in media buffer M and proceeds as follows.

If $Tm<Tc$, the oldest video frame is deleted in step 208 and then step 206 is repeated. This part of the process therefore removes from media buffer M any video frames that are too old, i.e., video frames for which $Tm<Tc$.

If $Tm>Tc+Tf$, or media buffer M is empty, the process moves to step 210 to insert a loss concealment video frame as the oldest video frame, and then moves to step 212. This part of the process inserts loss concealment video frames if queued video frames are out of range or media buffer M is empty. Examples of loss concealment video frames include the latest complete video frame or an image still.

If $Tc<Tm<Tc+Tf$, the oldest video frame is in-range and the process moves directly from step 206 to step 212 as shown.

In step 212, any audio frames with $Tm<Tc$ are deleted from commentary buffer C.

At this point, a particular video frame has been identified for mixing, and it remains to identify in step 216, 218 and 220 an appropriate corresponding audio frame to be mixed with the particular video frame.

In step 216, the mixer 127 checks the timestamp Tm of the oldest audio frame in commentary buffer C and proceeds as follows.

If $Tm<Tc$, the oldest audio frame is deleted in step 218 and then step 216 is repeated. This part of the process therefore removes from commentary buffer C any audio frames that are too old, i.e., audio frames for which $Tm<Tc$.

If $Tm>Tc+Tf$, or commentary buffer C is empty, the process moves to step 220 to insert alternate audio if the empty status has lasted beyond a specified threshold, and otherwise to insert a loss concealment audio frame, and then moves to step 222. This part of the process inserts alternate audio or loss concealment audio frames if queued audio frames are out of range or commentary buffer C is empty. The alternate audio is used in place of loss concealment audio frames when there are too many consecutive missing audio frames to effectively conceal, based upon the above-noted threshold. The alternate audio illustratively comprises a sequence of multiple audio frames, such as an alternate default commentary, prerecorded background music, advertising, general announcements or combinations thereof. Examples of loss concealment audio frames include low-level white noise or repeated audio.

If $Tc<Tm<Tc+Tf$, the oldest audio frame is in-range and the process moves directly from step 216 to step 222 as shown.

In step 222, the particular identified video frame and the appropriate corresponding audio frame, which illustratively represent the oldest video frame from media buffer M and the oldest audio frame from commentary buffer C, are sent to the media mixer module 128 to be mixed together to create an output commented video frame.

In step 224, a determination is made as to whether or not the measured current commentary delay D exceeds a maximum delay tolerance Dx. If D>Dx, the media processor 106 signals the commentator station 110-1 to restart its video player in order to allow the system to resynchronize, and otherwise does not so signal the commentator station 110-1.

In step 226, the current iteration of the mixer algorithm 200 is exited. Another iteration will be triggered at the next timer interrupt, which restarts the process as described above for mixing of the next selected video and audio frames.

It is to be appreciated that the particular process steps of the FIG. 2 flow diagram and other flow diagrams herein are presented by way of illustrative example only, and should not be construed as limiting in any way. Additional or alternative process steps may be used, and the ordering of the steps may be varied, in other embodiments. Also, steps shown as being performed serially in illustrative embodiments can be performed at least in part in parallel with one another in other embodiments.

As noted above, some embodiments are configured to support multiple remote commentators. For example, two or more commentators at different locations can jointly comment on the same game or other live event for the same audience. As long as the voice communication delay between the commentators is within tolerance, illustrative embodiments readily accommodate multiple commentators.

In multiple commentator embodiments of this type, a plurality of distinct streams of audio content are illustratively received from respective distinct commentator applications on respective distinct commentator stations, and the frames of the video content are combined with the plurality of distinct streams of audio content in a media processor in order to generate the commented video content.

Figure 3:
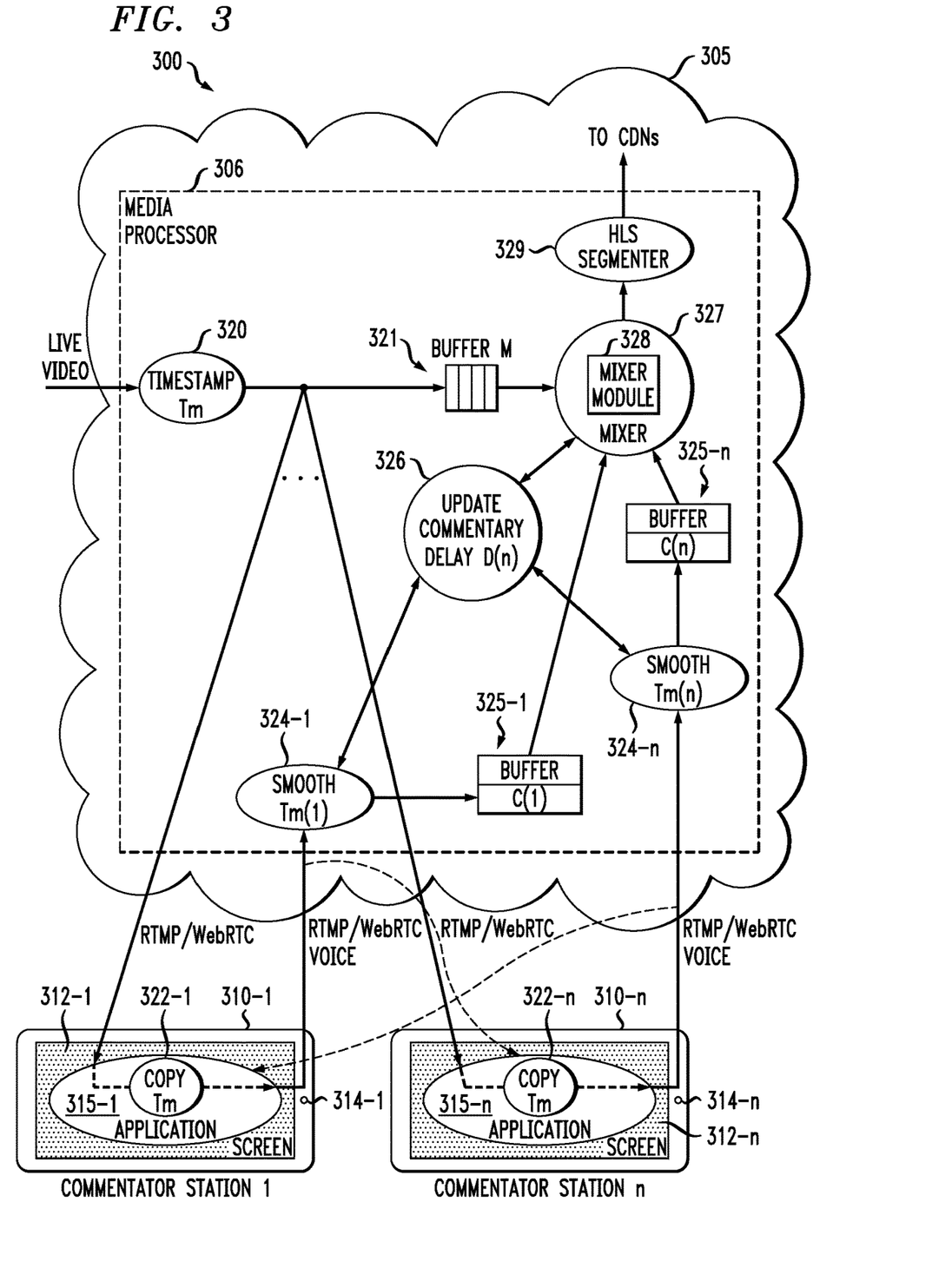
FIG. 3 is a block diagram of a content delivery system with multiple remote commentators in an illustrative embodiment.

FIG. 3 shows one example of an illustrative embodiment of this type. More particularly, FIG. 3 shows a content delivery system 300 that comprises a network 305, a media processor 306 and a plurality of commentator stations 310-1, . . . 310-n. It is assumed that the system 300 further comprises additional components, such as live media server 102, video camera 104 and CDN web servers 108 previously described in conjunction with the FIG. 1 embodiment. The media processor 306 generally operates in a manner similar to that previously described for media processor 106 but its functionality is expanded to accommodate multiple remote commentators rather than a single remote commentator as in the FIG. 1 embodiment. In addition, a given one of the commentator stations 310-1, . . . 310-n generally operates in a manner similar to that previously described for commentator station 110-1.

The commentator stations 310-1, . . . 310-n as illustrated in FIG. 3 comprise respective screens 312-1, . . . 312-n, microphones 314-1, . . . 314-n, commentator applications 315-1, . . . 315-n, and timestamp modules 322-1, . . . 322-n, which correspond to respective components 112, 114, 115 and 122 of commentator station 110-1.

In the FIG. 3 embodiment, the timestamp modules 322-1, . . . 322-n of the respective commentator applications 315-1, . . . 315-n of the respective commentator stations 310-1, . . . 310-n copy the timestamps Tm from the received frames of the incoming live video streams delivered by the media processor 306 to their respective audio commentary streams prior to delivering those audio commentary streams back to the media processor 306. The media processor 306 comprises a timestamp module 320 and a media buffer 321, the latter also denoted as media buffer M, which correspond to respective components 120 and 121 of media processor 106.

The media processor 306 separately smooths and queues the different audio commentary streams received from the respective commentator applications 315-1, . . . 315-n, utilizing respective timestamp smoothing modules 324-1, . . . 324-n and respective audio frame buffers 325-1, . . . 325-n. The audio frame buffers 325-1, . . . 325-n are also denoted herein as commentary buffers C(1) through C(n).

The media processor 306 comprises a delay update module 326, configured to control updated commentary delays for the received audio content from respective ones of the commentator stations 310. For example, for the received audio content from commentator station 310-n, the delay update module 326 utilizes the smoothed timestamp Tm(n) from timestamp smoothing module 324-n to set link delay D(n) as $D(n)=Td(n)+Tj(n)$ where Td(n) and Tj(n) are the respective audio delay and jitter tolerance for voice uplink n from commentator station 310-n to the media processor 306. A similar delay update process is performed in delay update module 326 for the received audio content from each of the other commentator stations 310. Although shown as a single module in this embodiment, the delay update module 326 in other embodiments can be implemented as multiple separate modules, one for each of the commentator stations from which audio commentary is received.

The media processor 306 further comprises mixer 327 which includes a media mixer module 328. The mixer 327 is coupled to an HLS segmenter 329. These components 327, 328 and 329 correspond generally to components 127, 128 and 129 of the FIG. 1 embodiment. However, the mixer 327 of the media processor 306 is configured to synchronize and mix the video frames of the live video content with the audio commentary frames received from the multiple commentator stations 310. In this embodiment, the video frames are delayed by an amount sufficient to accommodate the remote commentator with the longest delay that is within the maximum delay tolerance Dx.

Figure 4:
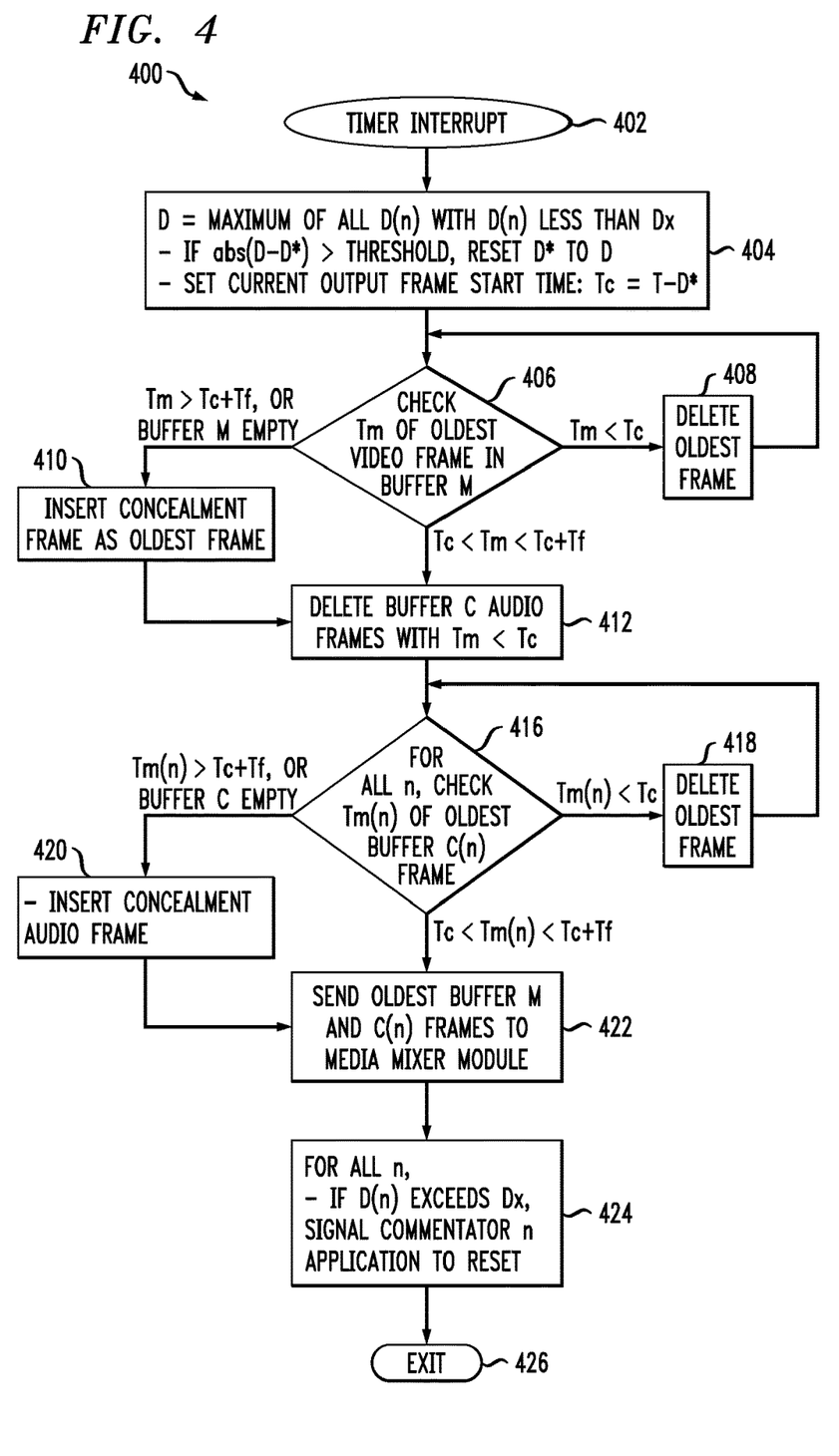
FIG. 4 is a flow diagram of a mixer algorithm for multiple remote commentators in an illustrative embodiment.

FIG. 4 shows an example of a mixer algorithm 400 implemented at least in part by the mixer 327 in the media processor 306 in content delivery system 300 of FIG. 3. It is again assumed that the mixer algorithm 400 is timer driven to generate video synchronously at a standard frame rate clock interval, e.g., 29.97 Hz.

The mixer algorithm 400 illustratively comprises repeated iterations of steps 402 through 426. Although these steps are performed primarily by mixer 327, other modules such modules 324 and 326, or more generally other portions of the media processor 306, can perform at least portions of one or more of the steps.

The steps 402 through 426 of the mixer algorithm 400 correspond generally to respective corresponding steps 202 through 226 of the mixer algorithm 200 as previously described, but suitably modified to accommodate the multiple commentator stations 310-1, . . . 310-n. References below to "for all n" should be understood to refer to all index values from 1 to n, which correspond to respective ones of the n remote commentators. Similarly, certain references to delays D(n), timestamps Tm(n), and commentary buffers C(n) in the figure, as well as references to other related parameters in the following description, should be understood from the context to span over all of the index values from 1 to n. Accordingly, in some contexts herein the variable n should be viewed as an index, encompassing all integer values from 1 to n, and in other contexts it refers only to the particular index value n. The meaning in the various contexts will be readily apparent to those skilled in the art.

In step 402, a given iteration of the mixer algorithm 400 is triggered via a timer interrupt as shown.

In step 404, the current frame output time range is updated. The current frame output time range is bounded by frame starting time Tc and Tc+Tf, where Tf is the duration of a video frame. As shown, Tc is set as T-D*, where T is the clock time of the media processor 306. Essentially, the setting of Tc instructs the mixer 327 to delay the video frame output by a delay D*. D* is periodically reset to the measured current commentary delay D, when the difference between D and D* exceeds a preset threshold. In this embodiment, D is set to the largest of the D(n) which does not exceed Dx.

More specifically, D(n)=Td(n)+Tj(n) where Td(n) is the measured current audio delay for audio commentator stream n and Tj(n) is the extra delay added to accommodate potential jitter from the voice uplink of commentator n. At each audio frame's ingestion, Td(n) is calculated as T-Tm(n)(smoothed). The remaining delays D(1) through D(n−1) are each determined in a similar manner, and as mentioned previously, the measured current commentary delay D is set to the largest of the D(n) which does not exceed Dx. As the overall system is asynchronous, the measured current commentary delay D is likely to drift over time, necessitating the reset of D*. The reset threshold, however, is configured to minimize frequent resets to minimize interruption of the operation of the media mixer module 328.

Using real-time uplink protocols, Tj(n) should be small and can be determined via link quality tests during system initialization. However, the present embodiment allows for Tj(n) to be derived from the Tm(n) data before smoothing and applied as a dynamic variable.

The mixer 327 then selects the appropriate input video and audio frames to mix from media buffer M and commentary buffers C(1) through C(n), respectively, also denoted as respective buffers 321 and 325-1, . . . 325-n in FIG. 3. This portion of the process is carried out using steps 406 through 422.

In step 406, the mixer 327 checks the timestamp Tm of the oldest video frame in media buffer M and proceeds as follows.

If Tm<Tc, the oldest video frame is deleted in step 408 and then step 406 is repeated. This part of the process therefore removes from media buffer M any video frames that are too old, i.e., video frames for which Tm<Tc.

If Tm>Tc+Tf, or media buffer M is empty, the process moves to step 410 to insert a loss concealment video frame as the oldest video frame, and then moves to step 412. This part of the process inserts loss concealment video frames if queued video frames are out of range or media buffer M is empty. Examples of loss concealment video frames include the latest complete video frame or an image still.

If Tc<Tm<Tc+Tf, the oldest video frame is in-range and the process moves directly from step 406 to step 412 as shown.

In step 412, any audio frames with Tm<Tc are deleted from commentary buffers C(1) though C(n).

At this point, a particular video frame has been identified for mixing, and it remains to identify in step 416, 418 and 420 appropriate corresponding audio frames from the respective commentary buffers C(1) through C(n) to be mixed with the particular video frame.

In step 416, for all n, the mixer 327 checks the timestamp Tm(n) of the oldest audio frame in each of the commentary buffers C(1) through C(n) and proceeds as follows.

If Tm(n)<Tc, the oldest audio frame is deleted in step 418 and then step 416 is repeated.

This part of the process therefore removes from commentary buffer C(n) any audio frames that are too old, i.e., audio frames for which Tm(n)<Tc.

If Tm(n)>Tc+Tf, or commentary buffer C(n) is empty, the process moves to step 420 to insert a loss concealment audio frame, and then moves to step 422. This part of the process inserts loss concealment audio frames if queued audio frames are out of range or commentary buffer C(n) is empty. Examples of loss concealment audio frames include low-level white noise or repeated audio. Although not indicated in the figure, it is possible in other embodiments to use alternate audio in place of loss concealment audio frames when there are too many consecutive missing audio frames to effectively conceal.

If Tc<Tm(n)<Tc+Tf, the oldest audio frame of commentary buffer C(n) is in-range and the process moves directly from step 416 to step 422 as shown.

The above-described steps 416, 418 and 420 are performed for each of the different commentator buffers C(1) through C(n) to identify an appropriate corresponding audio frame for each of the n commentators.

In step 422, the particular identified video frame and the appropriate corresponding audio frames, which illustratively represent the oldest video frame from media buffer M and the oldest audio frames from respective commentary buffers C(1) through C(n), are sent to the media mixer module 328 to be mixed together to create an output commented video frame.

In step 424, a determination is made for all n as to whether or not the measured current commentary delay D(n) exceeds a maximum delay tolerance Dx. If D(n)>Dx, the media processor 306 signals the corresponding commentator station 310-n to restart its video player in order to allow the system to resynchronize, and otherwise does not so signal the commentator station 310-n. Also, any buffered audio frames for the commentator stream with measured current commentary delay D(n)>Dx are deleted from the corresponding commentary buffer C(n), thereby excluding those excessively delayed frames from possible selection for mixing with the video frames.

In step 426, the current iteration of the mixer algorithm 400 is exited. Another iteration will be triggered at the next timer interrupt, which restarts the process as described above for mixing of the next selected video and audio frames.

Again, it is to be appreciated that the particular process steps of the FIG. 4 flow diagram and other flow diagrams herein are presented by way of illustrative example only, and should not be construed as limiting in any way. The process steps can be varied in the manner described previously.

As is apparent from the foregoing, illustrative embodiments disclosed herein are readily scalable to potentially large numbers of commentators, at least some of which are present at respective locations that are remote from a live video event venue.

Moreover, illustrative embodiments disclosed herein can be implemented at least in part using standard based built-in clients and HTTP servers, and thus at substantially reduced cost and complexity relative to conventional approaches.

Illustrative embodiments are not limited to use with the HLS protocol. For example, the disclosed embodiments can be adapted to save bandwidth with any HTTP based streaming protocol, including the Microsoft MSS protocol. Moreover, it is to be appreciated that other embodiments can be configured utilizing a wide variety of other types of streaming protocols and accordingly are not limited to use with live streaming or HTTP.

Embodiments of the invention can be implemented using any type of mobile device or more generally any other type of client device, including, for example, desktop, laptop or tablet personal computers, smart televisions, smart watches, gaming systems and other processing devices.

It should once again be noted that the above-described arrangements are exemplary only, and alternative arrangements can be used in other embodiments.

The disclosed techniques can also provide significant advantages in numerous content delivery contexts other than live event video.

A given client, server or other component in a content delivery system as disclosed herein is configured utilizing a corresponding processing device comprising a processor coupled to a memory. The processor executes software code stored in the memory in order to control the performance of processing operations and other functionality. The processing device also comprises a network interface that supports communication over one or more networks.

The processor may comprise, for example, a microprocessor, an application-specific integrated circuit (ASIC), a field-programmable gate array (FPGA), a central processing unit (CPU), an arithmetic logic unit (ALU), a digital signal processor (DSP), a graphics processing unit (GPU) or other similar processing device component, as well as other types and arrangements of processing circuitry, in any combination.

The memory stores software code for execution by the processor in implementing portions of the functionality of the processing device. A given such memory that stores software code for execution by a corresponding processor is an example of what is more generally referred to herein as a computer-readable storage medium having computer program code embodied therein, and may comprise, for example, electronic memory such as SRAM, DRAM or other types of random access memory, read-only memory (ROM), flash memory, magnetic memory, optical memory, or other types of storage devices in any combination.

Articles of manufacture comprising such computer-readable storage media are considered embodiments of the invention. The term "article of manufacture" as used herein should be understood to exclude transitory, propagating signals.

In addition, embodiments of the invention may be implemented in the form of integrated circuits comprising processing circuitry configured to implement processing operations, such as mixing of live video and audio-only commentary from multiple remote commentators, associated with content delivery.

The particular configurations of content delivery systems described herein are exemplary only, and a given such system in other embodiments may include other elements in addition to or in place of those specifically shown, including one or more elements of a type commonly found in a conventional implementation of such a system.

For example, in some embodiments, a content delivery system may be configured to utilize the disclosed techniques to provide additional or alternative functionality in other contexts. The disclosed techniques can be similarly adapted for use in a wide variety of other types of content delivery systems.

It is also to be appreciated that the particular process steps used in the embodiments described above are exemplary only, and other embodiments can utilize different types and arrangements of processing operations.

It should again be emphasized that the embodiments of the invention as described herein are intended to be illustrative only. Other embodiments of the invention can be implemented utilizing a wide variety of different types and arrangements of content delivery systems, networks, and devices than those utilized in the particular embodiments described herein. In addition, the particular assumptions made herein in the context of describing certain embodiments need not apply in other embodiments. These and numerous other alternative embodiments will be readily apparent to those skilled in the art.

What is claimed is:

1. A method comprising:
   receiving video content from at least one video source;
   timestamping frames of the video content to generate respective first timestamps;
   providing the frames in association with the respective first timestamps to a commentator application implemented on a client device;
   receiving audio content from the commentator application in association with respective second timestamps;
   combining the frames of the video content with the received audio content based at least in part on the first timestamps and the second timestamps to generate commented video content;
   providing the commented video content to one or more servers of a content delivery network for delivery to one or more viewer devices;
   wherein the method is implemented in at least one processing device comprising a processor coupled to a memory, said at least one processing device being configured to communicate via one or more network interfaces with the client device that implements the commentator application;
   wherein the audio content received from the commentator application in association with respective second timestamps comprises one of a plurality of distinct streams of audio content received from respective distinct commentator applications; and
   wherein combining the frames of the video content with the received audio content to generate commented video content further comprises combining the frames of the video content with at least portions of the plurality of distinct streams of audio content to generate the commented video content.

2. The method of claim 1 wherein the video content comprises live video from at least one live video source.

3. The method of claim 1 wherein the commentator application comprises a remote commentator application of a registered commentator device that is separate from said at least one processing device that implements the method.

4. The method of claim 1 wherein a given one of the second timestamps comprises a copy of a corresponding one of the first timestamps with the copy being generated by the commentator application.

5. The method of claim 4 wherein the second timestamp is inserted into a frame of the audio content by the commentator application.

6. The method of claim 1 wherein combining the frames of the video content with the received audio content based at least in part on the first timestamps and the second timestamps to generate commented video content further comprises:
   storing the frames of the video content in a video frame buffer of the processing device;
   storing frames of the received audio content in an audio frame buffer of the processing device;

processing one or more of the second timestamps to determine an updated commentary delay for the received audio content; and combining the frames of the video content from the video frame buffer with corresponding ones of the frames of the received audio content from the audio frame buffer based at least in part on the updated commentary delay.

7. The method of claim 1 wherein receiving audio content from the commentator application in association with respective second timestamps comprises receiving a plurality of audio frames having inserted therein respective ones of the second timestamps that are copies of corresponding ones of the first timestamps.

8. The method of claim 1 further comprising:
extracting respective ones of the second timestamps from respective frames of the received audio content;
applying a smoothing algorithm to the extracted second timestamps; and
utilizing the smoothed second timestamps in combining the frames of the video content with the received audio content.

9. The method of claim 1 wherein combining the frames of the video content with the received audio content based at least in part on the first timestamps and the second timestamps to generate commented video content further comprises:
comparing a current commentary delay to a designated delay;
responsive to a difference between the current commentary delay and the designated delay being above a specified threshold, resetting the designated delay to the current commentary delay;
determining a start time of a current output frame of the commented video content as a function of a processor clock time and the designated delay; and
initiating output of the current output frame of the commented video content in accordance with the determined start time.

10. The method of claim 9 wherein the current commentary delay is determined as a function of a measured delay of a frame of the audio content and a jitter accommodation component for the commentator application.

11. The method of claim 10 wherein the measured delay of the frame of the audio content is determined as a function of a corresponding one of the second timestamps after any smoothing and the processor clock time.

12. The method of claim 10 wherein the jitter accommodation component for the commentator application is determined by processing a plurality of the second timestamps prior to any smoothing.

13. The method of claim 1 wherein combining the frames of the video content with the received audio content based at least in part on the first timestamps and the second timestamps to generate commented video content further comprises at least one of:
deleting from each of one or more video or audio frame buffers one or more frames having timestamps earlier than a current output frame start time;
responsive to an empty video or audio frame buffer, or a video or audio frame having a timestamp greater than a sum of the current output frame time and a frame duration, inserting a video or audio loss concealment frame; and
responsive to a measured delay of an audio frame of the audio content exceeding a specified threshold, signaling the commentator application to restart its playback of the video content;

wherein different instances of at least one of the deleting, inserting and signaling are utilized in combining the frames of the video content with audio content from respective distinct commentator applications to generate commented video content.

14. A method comprising:
receiving video content from at least one video source;
timestamping frames of the video content to generate respective first timestamps;
providing the frames in association with the respective first timestamps to a commentator application implemented on a client device;
receiving audio content from the commentator application in association with respective second timestamps;
combining the frames of the video content with the received audio content based at least in part on the first timestamps and the second timestamps to generate commented video content;
providing the commented video content to one or more servers of a content delivery network for delivery to one or more viewer devices;
wherein the method is implemented in at least one processing device comprising a processor coupled to a memory, said at least one processing device being configured to communicate via one or more network interfaces with the client device that implements the commentator application;
wherein the frames of the video content are provided in association with the first timestamps to the commentator application at a first video quality level and the commented video content is provided to the one or more servers of the content delivery network at a second video quality level wherein the second video quality level is higher than the first video quality level; and
wherein the audio content received from the commentator application in association with respective second timestamps comprises one of a plurality of distinct streams of audio content received from respective distinct commentator applications.

15. An article of manufacture comprising a non-transitory computer-readable storage medium having computer program code embodied therein, wherein the computer program code when executed in at least one processing device causes said at least one processing device:
to receive video content from at least one video source;
to timestamp frames of the video content to generate respective first timestamps;
to provide the frames in association with the respective first timestamps to a commentator application implemented on a client device;
to receive audio content from the commentator application in association with respective second timestamps;
to combine the frames of the video content with the received audio content based at least in part on the first timestamps and the second timestamps to generate commented video content; and
to provide the commented video content to one or more servers of a content delivery network for delivery to one or more viewer devices;
wherein said at least one processing device comprises a processor coupled to a memory, and is configured to communicate via one or more network interfaces with the client device that implements the commentator application;
wherein the audio content received from the commentator application in association with respective second timestamps comprises one of a plurality of distinct streams of audio content received from respective distinct commentator applications; and wherein combining the frames of the video content with the received audio content to generate commented video content further comprises combining the frames of the video content with at least portions of the plurality of distinct streams of audio content to generate the commented video content.

16. The article of manufacture of claim 15 wherein the frames of the video content are provided in association with the first timestamps to the commentator application at a first video quality level and the commented video content is provided to the one or more servers of the content delivery network at a second video quality level wherein the second video quality level is higher than the first video quality level.

17. An apparatus comprising:
at least one processing device comprising a processor coupled to a memory;
wherein said at least one processing device is configured:
to receive video content from at least one video source;
to timestamp frames of the video content to generate respective first timestamps;
to provide the frames in association with the respective first timestamps to a commentator application implemented on a client device;
to receive audio content from the commentator application in association with respective second timestamps;
to combine the frames of the video content with the received audio content based at least in part on the first timestamps and the second timestamps to generate commented video content; and
to provide the commented video content to one or more servers of a content delivery network for delivery to one or more viewer devices;

wherein said at least one processing device further comprises one or more network interfaces configured for communication with the client device that implements the commentator application;

wherein the audio content received from the commentator application in association with respective second timestamps comprises one of a plurality of distinct streams of audio content received from respective distinct commentator applications; and wherein combining the frames of the video content with the received audio content to generate commented video content further comprises combining the frames of the video content with at least portions of the plurality of distinct streams of audio content to generate the commented video content.

18. The apparatus of claim 17 wherein said at least one processing device comprises at least one media processor coupled between a live media server and the one or more servers of the content delivery network.

19. The apparatus of claim 11 wherein the frames of the video content are provided in association with the first timestamps to the commentator application at a first video quality level and the commented video content is provided to the one or more servers of the content delivery network at a second video quality level wherein the second video quality level is higher than the first video quality level.

20. The apparatus of claim 11 wherein receiving audio content from the commentator application in association with respective second timestamps comprises receiving a plurality of audio frames having inserted therein respective ones of the second timestamps that are copies of corresponding ones of the first timestamps.

* * * * *

UNITED STATES PATENT AND TRADEMARK OFFICE
CERTIFICATE OF CORRECTION

PATENT NO. : 10,887,646 B2
APPLICATION NO. : 16/225335
DATED : January 5, 2021
INVENTOR(S) : Francis X. Zane et al.

It is certified that error appears in the above-identified patent and that said Letters Patent is hereby corrected as shown below:

In the Claims

Claim 19, Column 22, Line 20, please delete "The apparatus of claim 11" and insert therefor --The apparatus of claim 17--

Claim 20, Column 22, Line 27, please delete "The apparatus of claim 11" and insert therefor --The apparatus of claim 17--

Signed and Sealed this
Thirtieth Day of August, 2022

Katherine Kelly Vidal
*Director of the United States Patent and Trademark Office*